US008687505B2

(12) United States Patent
Yoon et al.

(10) Patent No.: US 8,687,505 B2
(45) Date of Patent: Apr. 1, 2014

(54) APPARATUS AND METHOD FOR CONTROLLING TRAFFIC

(75) Inventors: Sang Sik Yoon, Daejeon (KR); Sang Kil Park, Daejeon (KR); Sang Wan Kim, Daejeon (KR); Dong Won Kang, Daejeon (KR); Joon Kyung Lee, Daejeon (KR); Taesang Choi, Daejeon (KR); Kyeong Ho Lee, Daejeon (KR); Young Boem Choi, Gongju (KR); Ki Dong Nam, Daejeon (KR); Kyung Pyo Jun, Daejeon (KR); Jin Ho Hahm, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 285 days.

(21) Appl. No.: 12/975,130

(22) Filed: Dec. 21, 2010

(65) Prior Publication Data

US 2011/0149727 A1 Jun. 23, 2011

(30) Foreign Application Priority Data

Dec. 21, 2009 (KR) .......................... 10-2009-0128477

(51) Int. Cl.
*H04L 1/00* (2006.01)
(52) U.S. Cl.
USPC ........... 370/244; 370/242; 370/252; 370/469; 709/224; 726/11; 726/13
(58) Field of Classification Search
None
See application file for complete search history.

(56) References Cited

U.S. PATENT DOCUMENTS

| 6,728,929 | B1* | 4/2004 | Luong ........................... 714/807 |
| 7,328,349 | B2* | 2/2008 | Milliken ........................ 713/181 |
| 7,451,489 | B2* | 11/2008 | Cantrell et al. ................... 726/25 |
| 7,515,612 | B1* | 4/2009 | Thompson ..................... 370/474 |
| 7,703,138 | B2 | 4/2010 | Desai et al. |
| 7,856,661 | B1* | 12/2010 | Sebes et al. ...................... 726/22 |
| 2002/0154634 | A1 | 10/2002 | Basso et al. |
| 2003/0204632 | A1* | 10/2003 | Willebeek-LeMair et al. .............................. 709/249 |
| 2006/0114939 | A1* | 6/2006 | Singh ............................. 370/469 |
| 2006/0143710 | A1* | 6/2006 | Desai et al. ...................... 726/23 |
| 2006/0168318 | A1* | 7/2006 | Twiss ............................. 709/238 |
| 2008/0077793 | A1* | 3/2008 | Tan et al. ....................... 713/168 |
| 2009/0252041 | A1* | 10/2009 | Dolganow et al. ............ 370/241 |

FOREIGN PATENT DOCUMENTS

| KR | 100462480 B1 | 9/2004 |
| KR | 10-0650741 B1 | 11/2006 |
| KR | 10-2007-0059447 A | 6/2007 |

* cited by examiner

*Primary Examiner* — Donald Mills (57) ABSTRACT

A traffic control apparatus is provided which includes an interface connector to transmit/receive an Internet Protocol (IP) packet to/from an external circuit, a frame generator to receive the IP packet through the interface connector and to generate a Media Access Control (MAC) frame, and a network processor to transmit/receive the IP packet to/from the frame generator, to execute at least one programmable application, and to identify and classify the at least one programmable application.

20 Claims, 7 Drawing Sheets

APPARATUS AND METHOD FOR CONTROLLING TRAFFIC

CROSS-REFERENCE TO RELATED APPLICATION

This application claims the benefit of Korean Patent Application No. 10-2009-0128477, filed on Dec. 21, 2009, in the Korean Intellectual Property Office, the disclosure of which is incorporated herein by reference.

BACKGROUND

1. Field of the Invention

The present invention relates to an apparatus and method for measuring, analyzing, controlling, and managing high-speed Internet Protocol (IP) traffic.

2. Description of the Related Art

In this information era, the speed of Internet Protocol (IP) wire-lines is reaching high-speed rates very rapidly as a result of popular use of the Internet, along with emergence of application services requiring a large amount of bandwidth, such as Peer-to-Peer (P2P) services, Video on Demand (VoD) services, Internet Protocol Television (IPTV) services, or Voice over IP (VoIP) services.

Accordingly, there is a need for technology to measure, collect, analyze, control, and manage service traffic that is increased suddenly. The technology has been actively developed in a software scheme using a general-purpose server.

Recently, in order to address a packet loss problem due to high-speed lines, a hardware-based method using a high-speed Network Processor (NP) is also emerging.

To identify Internet application services in real-time, 5-tuple information, such as a source IP address, a destination IP address, a protocol, a source port number, and a destination port number, are typically used. However, to more accurately identify various and precise application services that have recently emerged, the identification is possible only when the payload of a Transmission Control Protocol (TCP)/IP packet must be examined For example, in the case of a P2P service and a VoD service using the Web, accurate identification of these types of applications is possible by analyzing Hyper-Text Transfer Protocol (HTTP) header information.

In this example, since a pattern searching function may be performed multiple times to identify a single application, performance may be reduced even though a high-speed Network Processor (NP) is used. In particular, when identifying applications without a Ternary Content Address Memory (TCAM) that enables searching for fixed-length pattern at a very high-speed, packet loss may occur because the fixed required packet processing time may not be guaranteed.

SUMMARY

According to an aspect of the present invention, there is provided an apparatus of controlling a traffic, the apparatus including an interface connector to transmit/receive an Internet Protocol (IP) packet to/from an external circuit; a frame generator to receive the IP packet through the interface connector and to generate a Media Access Control (MAC) frame; and a network processor to transmit/receive the IP packet to/from the frame generator, to execute at least one programmable application, and to identify and classify the at least one programmable application.

According to another aspect of the present invention, there is provided a method of controlling a traffic, the method including waiting until at least one packet is received from at least one external circuit; receiving the at least one packet from the at least one external circuit; analyzing a protocol header for each of layers of the received packet; examining whether the layers satisfy a filtering condition, when the analyzing determines that the packet is error-free; identifying and classifying applications corresponding to the layers by using a high-speed search function when the layers do not satisfy the filtering condition; and executing a command to process the at least one packet based on a result of the identifying and classifying the applications.

According to another aspect of the present invention, there is provided a method of controlling a traffic, the method including transmitting/receiving an IP packet to/from an external circuit; generating a MAC frame through the received IP packet; and executing at least one programmable application for the IP packet, and identifying and classifying the at least one programmable application.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
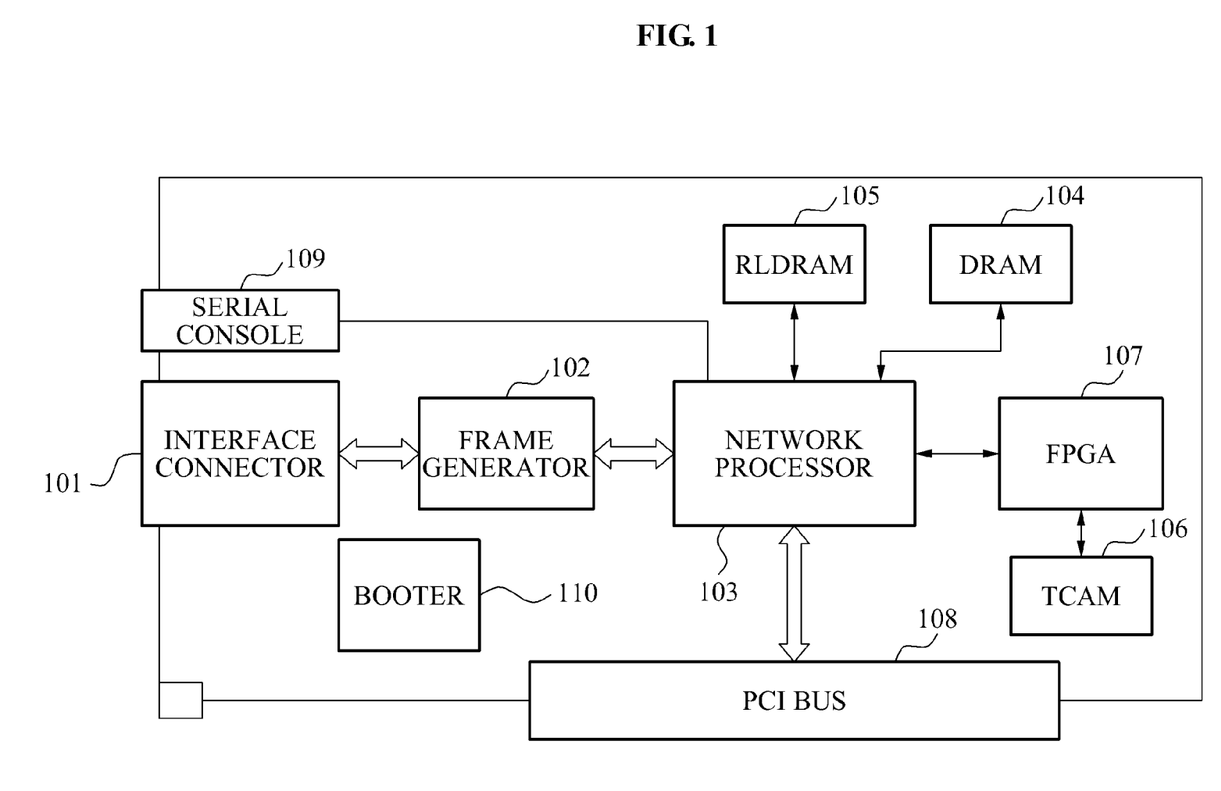
FIG. 1 is a block diagram illustrating a configuration of a traffic control apparatus according to an embodiment of the present invention.
Figure 2:
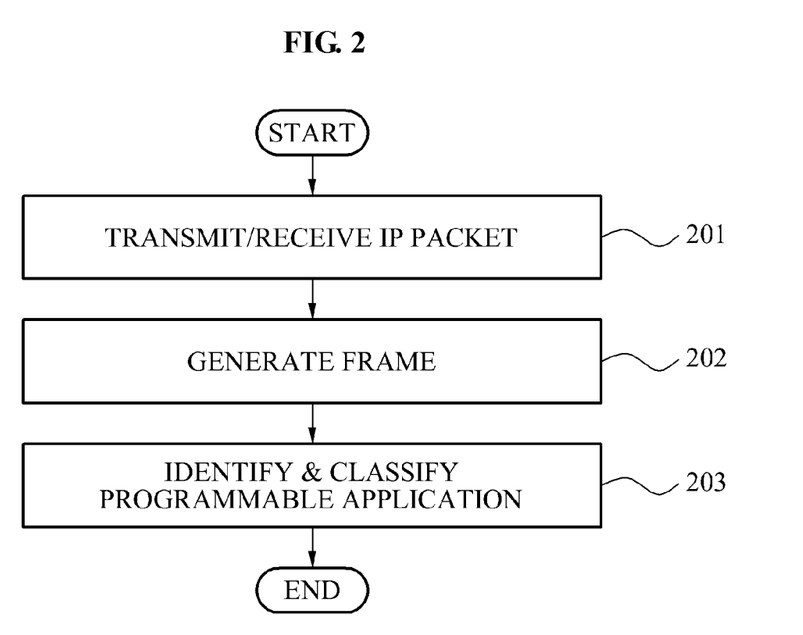
FIG. 2 is a flowchart illustrating a traffic control method according to an embodiment of the present invention.

FIG. 1 is a block diagram illustrating a configuration of a traffic control apparatus according to an embodiment of the present invention, and FIG. 2 is a flowchart illustrating a traffic control method according to an embodiment of the present invention.

As shown in FIG. 1, the traffic control apparatus includes an interface connector 101, a frame generator 102, and a network processor 103. Additionally, the traffic control apparatus may further include multiple modules to support a function of the network processor 103.

Referring to FIG. 2, in operation 201, the traffic control apparatus may transmit/receive an Internet Protocol (IP) packet to/from an external circuit using the interface connector 101.

Here, the interface connector 101 may be configured based on traffic, for example 2×1 gigabits per second (Gbps), 4×1 Gbps, 10 Gbps, 2×10 Gbps, 4×10 Gbps, and the like, based on a packet processing performance of the network processor 103. The external circuit may include, for example, a Gigabit Ethernet (GbE) circuit, a Packet over Sonet (PoS) circuit, and the like.

In operation 202, the frame generator 102 may receive the IP packet through the interface connector 101, and may generate a Media Access Control (MAC) frame.

In operation 203, the network processor 103 may transmit/receive the IP packet to/from the frame generator 102, may execute at least one programmable application, and may identify and classify the at least one programmable application.

Here, the network processor 103 may be implemented a general network processor among various network processors, such as Octeon, EZchip, X11, and the like.

To support the function of the network processor 103 as described above, the traffic control apparatus may further include a Dynamic Random Access Memory (DRAM) 104, a Reduced Latency DRAM (RLDRAM) 105, and a Ternary Content Addressable Memory (TCAM) 106. The DRAM 104 may store and manage information processed by the network processor 103. The RLDRAM 105 may have an improved performance to process a packet at a high speed, and the TCAM 106 may guarantee an identical search response time when searching for a pattern having a fixed length at a high speed.

When the TCAM 106 is unable to be connected directly to the network processor 103, the traffic control apparatus may enable a Field Programmable Gate Array (FPGA) 107 to connect the TCAM 106 to the network processor 103 using an interface channel of another RLDRAM.

Additionally, the traffic control apparatus may enable a Peripheral Component Interconnect (PCI) bus 108 to connect the network processor 103 to a host and to transceive a variety of information and a related control command of the network processor and the host.

The traffic control apparatus may further include a serial console 109 to support a console function of the network processor 103, and a booter 110 to control an initialization of a state of the traffic control apparatus and whether to operate the traffic control apparatus.

According to an embodiment of the present invention, the traffic control apparatus may be used to identify and classify application services and to control traffic by generating and executing a program for application identification and traffic control in the network processor 130.

Hereinafter, a traffic control method according to an embodiment of the present invention will be further described with reference to FIGS. 3 through 6B.

Figure 3:
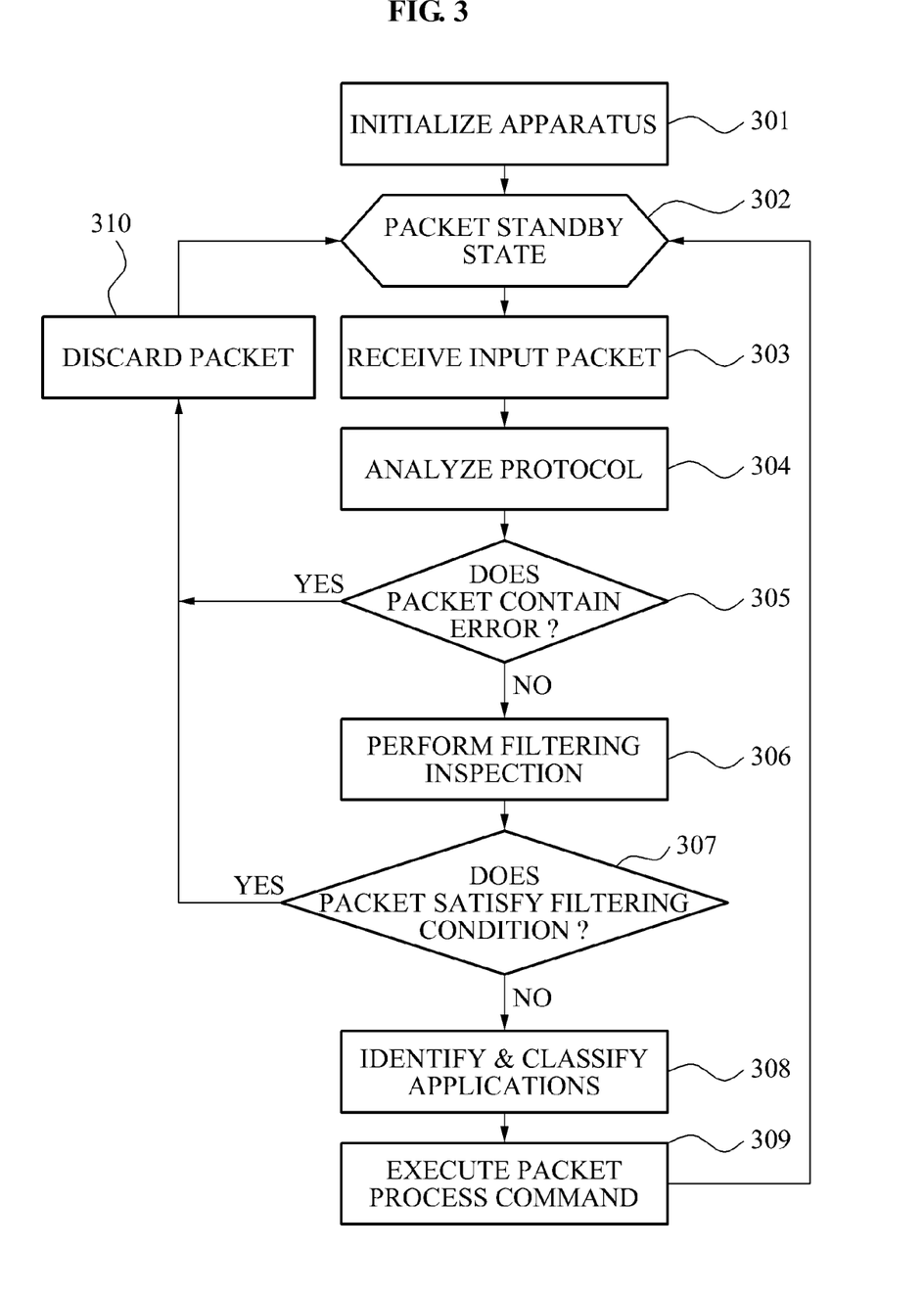
FIG. 3 is a details flowchart illustrating a traffic control method according to an embodiment of the present invention.

FIG. 3 is a details flowchart illustrating a traffic control method according to an embodiment of the present invention.

In operation 301, a traffic control apparatus according to an embodiment of the present invention may be booted to initialize configuration values, and may perform a function of a related device driver in the traffic control apparatus to initialize the traffic control apparatus.

In operation 302, the traffic control apparatus may remain in a packet standby state until at least one packet is received from at least one external circuit.

In operation 303, the traffic control apparatus may receive the at least one packet from the at least one external circuit. In operation 304, the traffic control apparatus may analyze a protocol header of the received packet for each of layers of the received packet. Here, the layers may include, for example various layers, such as a data link layer (L2), a network layer (L3), a transport layer (L4), and an application layer (L7).

Specifically, in operation 304, the traffic control apparatus may perform, simultaneously or in a predetermined order, extracting at least one of a value of a virtual Local Area Network (VLAN) identifier (ID), a source MAC address value, and a destination MAC address value through an analysis of a header in the L2, extracting at least one of an IP protocol version value, a source IP address value, a destination IP address value, and a protocol number through an analysis of a header in the L3, and extracting at least one of a number of a Transmission Control Protocol (TCP) packet, a number of a User Datagram Protocol (UDP) packet, a source port number, and a destination port number through an analysis of a header in the L4.

Additionally, in operation 304, the traffic control apparatus may determine whether the packet contains an error as a result of the analyzing of the protocol header in operation 305. For example, the traffic control apparatus may determine whether to correspond to a protocol format for each of the layers, or may determine whether a size indicated in the packet is identical to a size of an actually inputted packet, or may determine whether the error occurs in at least one of a checksum field of an IP packet, a checksum field of the TCP packet, and a checksum field of the UDP packet.

When the packet is determined to contain an error as the result of the analyzing, the traffic control apparatus may discard the packet in operation 310, and may be returned to the packet standby state in operation 302. Conversely, when the packet is determined to be error-free, the traffic control apparatus may proceed to a next operation.

When the packet is determined to be error-free, the traffic control apparatus may perform filtering inspection in operation 306, to examine whether the layers L2, L3, L4, and L7 of a normal packet satisfy a filtering condition.

In operation 307, the traffic control apparatus may examine whether the layers satisfy the filtering condition, when the packet is determined to be error-free.

When the filtering inspection succeeds, and when the packet is determined to satisfy the filtering condition, that is, determined to be targeted for filtering in operation 307, the traffic control apparatus may discard the packet in operation 310, and operation flow may be returned to the packet standby state in operation 302. Conversely, when the filtering inspection fails, the traffic control apparatus may proceed to a next operation.

When the layers do not satisfy the filtering condition in operation 307, the traffic control apparatus may identify and classify applications corresponding to the layers by using a high-speed search function in operation 308.

For example, the traffic control apparatus may identify and classify the applications with respect to a packet where the filtering inspection fails, using a high-speed search function based on 7-tuple information, for example an input interface number, a source IP address, a destination IP address, a protocol number, a source port number, a destination port number, and a signature.

In operation 309, the traffic control apparatus may execute a packet process command to process the packet based on a result of the identifying and classifying of the applications.

Specifically, the traffic control apparatus may process the packet in response to the packet process command, and operation flow may be returned to the packet standby state in operation 302.

Hereinafter, operation 306 of performing packet filtering inspection will be further described with reference to FIG. 4.

Figure 4:
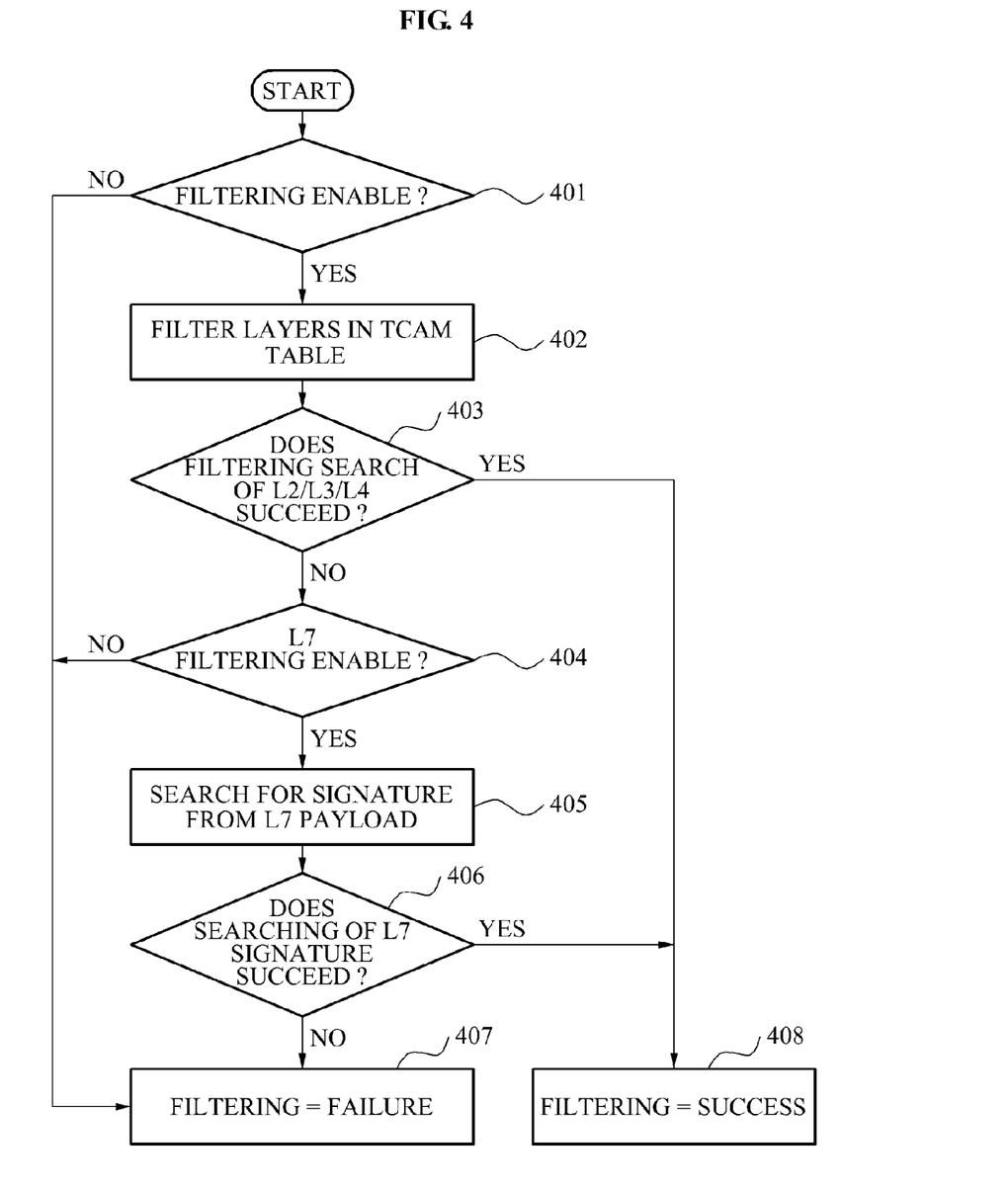
FIG. 4 is a flowchart illustrating a packet filtering inspection scheme according to an embodiment of the present invention.

FIG. 4 is a flowchart illustrating a packet filtering inspection scheme according to an embodiment of the present invention.

As shown in FIG. 4, in operation 401, the traffic control apparatus according to the embodiment of the present invention may examine whether the layers satisfy the filtering condition, as described above. Specifically, the traffic control apparatus may determine whether a filtering function is performed for each of the layers. As a result of the determining, when the filtering function is disabled, the traffic control apparatus may determine a result of the filtering as a failure, and may terminate the packet filtering inspection scheme in operation 407. Conversely, when the filtering function is enabled, the traffic control apparatus may proceed to operation 402.

When the filtering function is performed, the traffic control apparatus may filter the layers in a TCAM table based on the result of the analyzing of the protocol header in operation 402.

For example, when the filtering function is enabled, the traffic control apparatus may perform a filtering search in the TCAM table using the VLAN ID, the source MAC address, the destination MAC address, the IP protocol version, and the protocol information (*number that are extracted through the analysis of the headers in the L2, L3, and L4 in operation 304.

In operation 403, the traffic control apparatus may compare a result of the filtering search of at least one layer of the L2, L3, and L4.

For example, when the filtering search succeeds as a result of the filtering inspection in operation 306, the traffic control apparatus may store the result of the filtering search as a success in operation 408, and may proceed to a next operation. Conversely, when the filtering search fails, the traffic control apparatus may continue to proceed to operation 404.

In operation 404, the traffic control apparatus may examine whether the filtering function of the L7 is enabled. Specifically, when the filtering function of the L7 is disabled, the traffic control apparatus may store the result of the filtering search as a failure in operation 407, and may proceed to a next operation. Conversely, when the filtering function of the L7 is enabled, the traffic control apparatus may search for a filtering signature from an L7 payload of the packet in operation 405.

In other words, when the filtering function of the L7 is disabled, the traffic control apparatus may store the result of the filtering search as a failure.

In operation 406, the traffic control apparatus may compare a result of searching of an L7 signature.

When the searching of the L7 signature succeeds, the traffic control apparatus may store the result of the filtering as a success in operation 408. Conversely, when the searching of the L7 signature fails, the traffic control apparatus may store the result of the filtering as a failure in operation 407.

Hereinafter, operation 308 of classifying service traffic will be further described with reference to FIG. 5.

Figure 5:
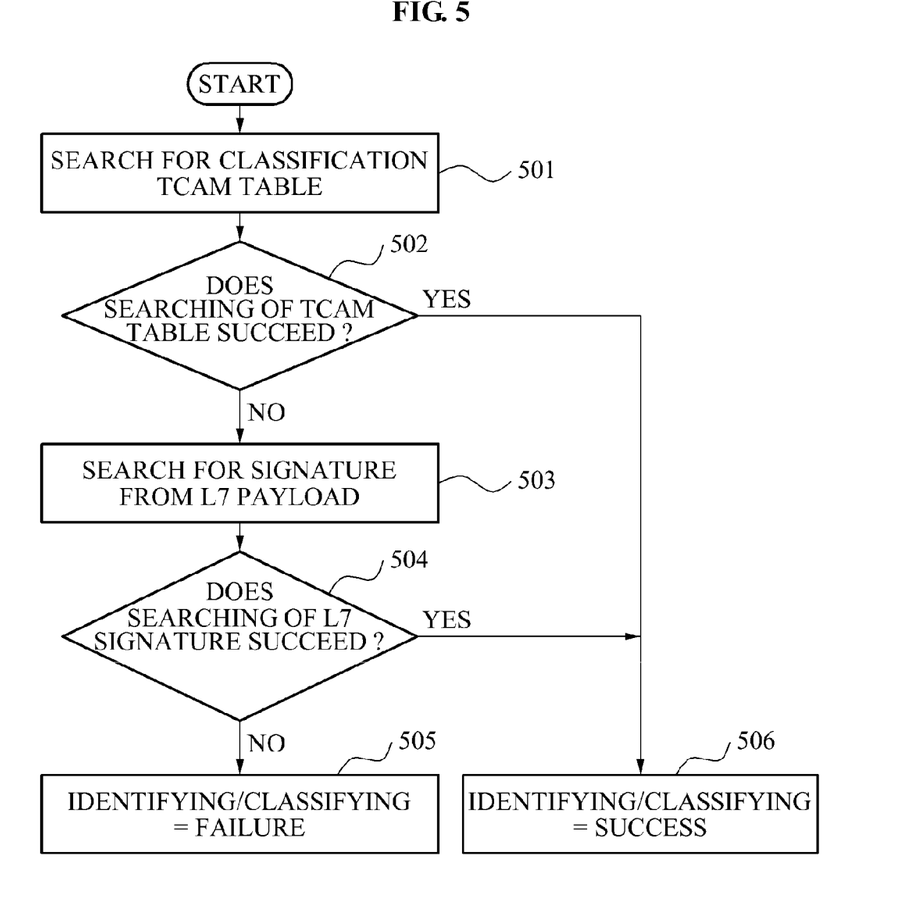
FIG. 5 is a flowchart illustrating a service traffic classification scheme according to an embodiment of the present invention.

FIG. 5 is a flowchart illustrating a service traffic classification scheme according to an embodiment of the present invention.

Referring to FIG. 5, in operation 501, the traffic control apparatus according to the embodiment of the present invention may search for a classification TCAM table of the applications using an input interface number, the source IP address, the destination IP address, a protocol, the source port number, and the destination port number.

In operation 502, the traffic control apparatus may determine whether the searching of the classification TCAM table succeeds. When the searching of the classification TCAM table succeeds, the traffic control apparatus may store a result of the identifying and classifying of the applications as a success, and may extract a packet process command code from the table in operation 506.

Conversely, when the searching of the classification TCAM table fails, the traffic control apparatus may search for an application identification signature from the L7 payload of the packet in operation 503.

In operation 504, the traffic control apparatus may determine whether the search for an application identification signature from the L7 payload of the packet in operation 503 succeeds. When the search for an application identification signature from the L7 payload of the packet in operation 503 succeeds, the traffic control apparatus may store the result of the identifying and classifying of the applications as a success, and may extract the packet process command code from the table in operation 506. Conversely, when the search for an application identification signature from the L7 payload of the packet in operation 503 fails, the traffic control apparatus may store the result of the identifying and classifying of the applications as a failure in operation 505.

Hereinafter, operation 309 of executing the packet process command will be further described with reference to FIGS. 6A and 6B.

Figure 6A:
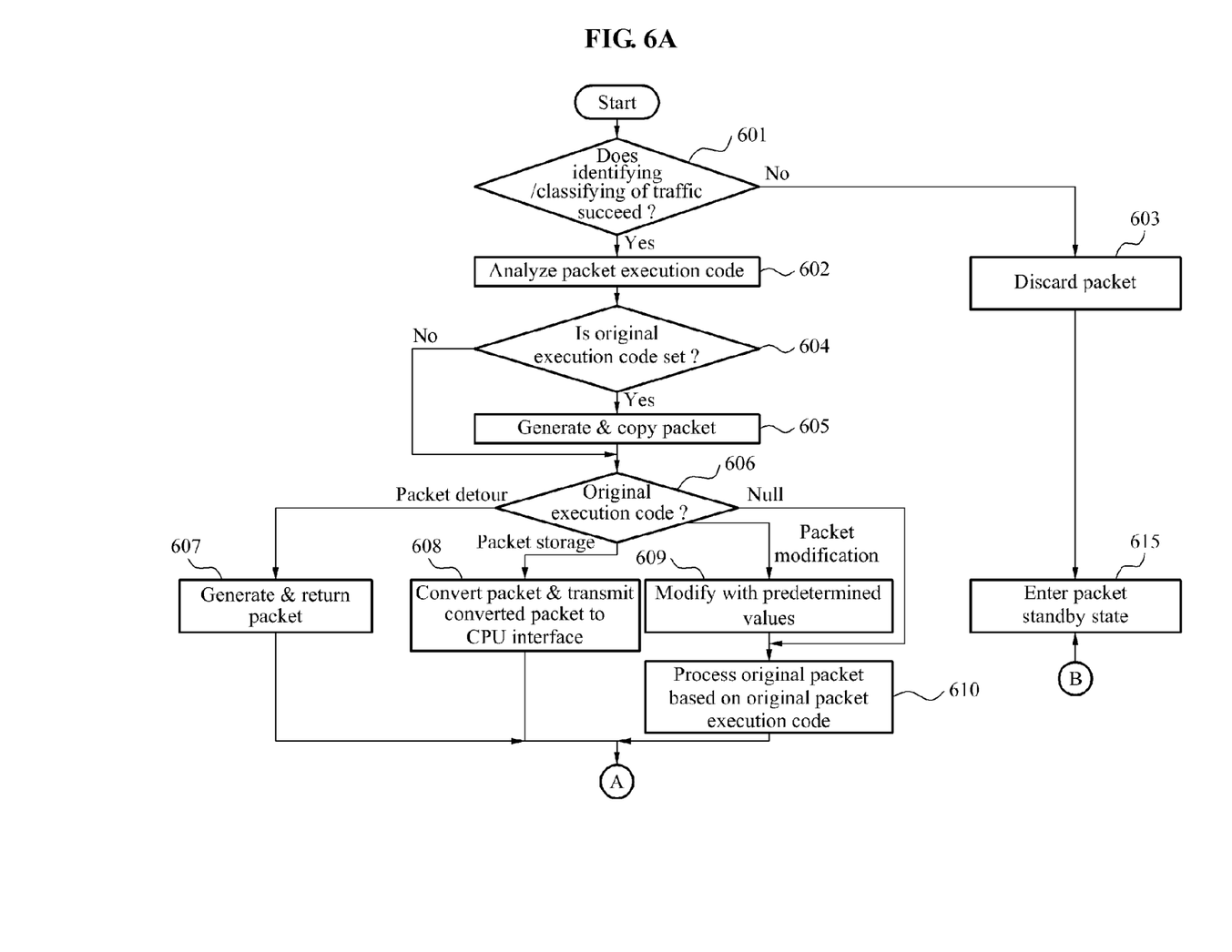
FIGS. 6A and 6B are flowcharts illustrating a packet process command execution scheme according to another embodiment of the present invention.
Figure 6B:
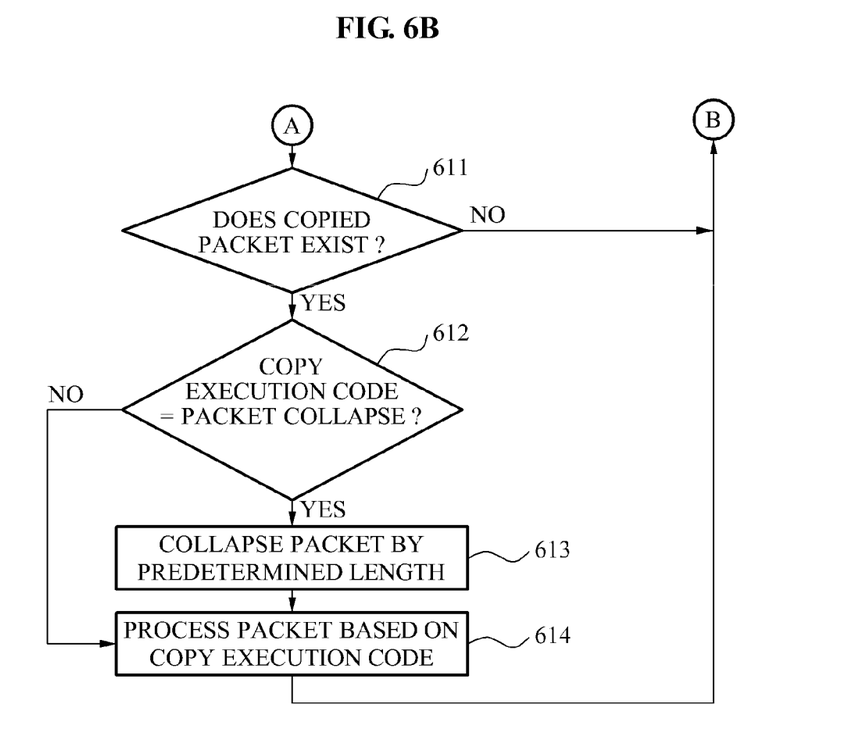

FIGS. 6A and 6B are flowcharts illustrating a packet process command execution scheme according to an embodiment of the present invention.

Referring to FIGS. 6A and 6B, when identifying and classifying the traffic in operation 308 is determined as a failure in operation 601, the traffic control apparatus may discard the packet using a processing scheme that is set in advance, in operation 603. Conversely, when identifying and classifying the applications in operation 308 is determined as a success in operation 601, the traffic control apparatus may search for and compare a result of identifying and classifying traffic of the applications, to analyze a packet execution code in operation 602. Here, the packet execution code may include an original execution code value, and a copy execution code value.

In other words, in operation 602, the traffic control apparatus may analyze the original execution code value and the copy execution code value when operation 308 succeeds.

Here, the original execution code value may include a preceding execution code used to process the original packet from the packet execution code, and the copy execution code value may include a preceding execution code used to process the copied packet.

In operation 604, the traffic control apparatus may compare the original execution code value as a result of the comparing of the result of the identifying and classifying the traffic of the applications.

When the original execution code value is set in operation 604, the traffic control apparatus may generate a new packet from the original packet, and may copy the new packet in operation 605.

In operation 606, the traffic control apparatus may determine a type of the original execution code value.

Specifically, when the original execution code value indicates a packet detour in operation 606, the traffic control apparatus may generate a packet used to connect to a HyperText Transfer Protocol (HTTP) detour site, and may return the packet in operation 607. When the original execution code value indicates a packet storage in operation 606, the traffic control apparatus may convert the packet into a Packet Capture (PCAP) format, may reduce a size of the packet by a fixed length, and may transmit the packet to a Central Processing Unit (CPU) interface in operation 608.

Additionally, when the original execution code value indicates a packet modification in operation 606, the traffic control apparatus may modify a destination MAC address, a protocol, an IP address, a port number, a Type of Service (ToS), and a TCP flag to predetermined values in operation

609. When the original execution code value indicates a null value in operation 606, the traffic control apparatus may process the original packet based on an original packet execution code in operation 610.

In operation 611, the traffic control apparatus may compare the copy execution code value, and may determine whether a copied packet exists.

When the copied packet is determined to exist, and simultaneously a packet collapse command of the copy execution code value is received, the traffic control apparatus may process the packet based on the copy execution code in operations 612 through 614.

Specifically, when the copied packet is determined to exist, the traffic control apparatus may either transfer the packet, or may copy the packet and transmit the copied packet to a copied port, based on the copy execution code value, in operation 614.

In operation 615, the traffic control apparatus may again enter the packet standby state when the packet process command is completely executed.

As described above, according to embodiments of the present invention, it is possible to provide an IP packet processing apparatus and method with a network processor that enables an identification and classification of application service traffic in real-time without any loss for a variety of application service traffic, as well as a direct control of service traffic.

Additionally, according to embodiments of the present invention, it is possible to provide a hardware system and method with a high-speed network processor and a TCAM that enable a direct control of application service traffic.

Furthermore, according to embodiments of the present invention, it is possible to identify and classify applications in real-time without any loss, by using a TCAM based on traffic of an Internet high-speed circuit that performs in a gigabit range of at least 10 Gbps. In addition, it is possible to use a high-speed circuit to perform various packet processing functions, such as a packet modification, a packet detour, a packet copy, or a packet storage, as well as a basic traffic control function, such as a packet discard or a packet transfer.

Moreover, according to embodiments of the present invention, it is possible to develop a system that measures, analyzes, and controls traffic of an Internet high-speed circuit. Also, it is possible to provide a system of managing traffic of various Internet services, such as a service of preventing additional costs from being incurred for each user, a VoIP traffic monitoring service, a parent control service, or a lawful data interception service.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus of controlling a traffic, the apparatus comprising:
    an interface connector to transmit/receive an Internet Protocol (IP) packet to/from an external circuit;
    a frame generator to receive the IP packet through the interface connector and to generate a Media Access Control (MAC) frame; and
    a network processor to transmit/receive the IP packet to/from the frame generator, to examine whether layers of the IP packet satisfy a filtering condition, to identify and classify at least one application corresponding to the IP packet by using a high-speed search function when the layers do not satisfy the filtering condition, and to execute a command to process the IP packet based on a result of the identifying and classifying of the at least one application,
    wherein the network processor executes the command by:
        comparing the result of identifying and classifying traffic of the at least one application, and analyzing an original execution code value and a copy execution code value;
        comparing the original execution code value as a result of the comparing of the result of identifying and classifying the traffic of the at least one application;
        processing the IP packet based on the original execution code value;
        comparing the copy execution code value and determining whether a copied IP packet exists; and
        processing the IP packet based on the copy execution code in response to a packet collapse command of the copy execution code value when the copied IP packet is determined to exist.

2. The apparatus of claim 1, further comprising:
    a Dynamic Random Access Memory (DRAM) to store and manage information processed by the network processor;
    a Reduced Latency DRAM (RLDRAM) to process the IP packet at a high speed; and
    a Ternary Content Addressable Memory (TCAM) to guarantee an identical search response time when searching for a pattern having a fixed length at a high speed.

3. The apparatus of claim 2, further comprising:
    a Field Programmable Gate Array (FPGA) to connect the TCAM to the network processor using an interface channel of another RLDRAM when the TCAM is unable to be connected directly to the network processor.

4. The apparatus of claim 1, further comprising:
    a Peripheral Component Interconnect (PCI) bus to connect the network processor to a host;
    a serial console to support a console function of the network processor; and
    a booter to control an initialization of a state of the apparatus and whether to operate the apparatus.

5. A method of controlling a traffic, the method comprising:
- waiting until at least one packet is received from at least one external circuit;
- receiving the at least one packet from the at least one external circuit;
- analyzing a protocol header for each of layers of the received packet;
- examining whether the layers satisfy a filtering condition, when the analyzing determines that the packet is error-free;
- identifying and classifying applications corresponding to the layers by using a high-speed search function when the layers do not satisfy the filtering condition; and
- executing a command to process the at least one packet based on a result of the identifying and classifying of the applications, wherein the layers comprise at least one of a data link layer (L2), a network layer (L3), a transport layer (L4), and an application layer (L7), wherein the examining of whether the layers satisfy the filtering condition comprises:
- examining whether a filtering function is performed for each of the layers;
- filtering the layers in a TCAM table based on the result of the analyzing of the protocol header, when the filtering function is performed for each of the layers;
- comparing a result of a filtering search of at least one layer of the L2, the L3, and the L4;
- examining whether the filtering function of the L7 is performed; and
- comparing a result of an L7 signature search, and wherein the examining of whether the filtering function of the L7 is performed comprises storing the result of the filtering search as a failure when the filtering function of the L7 is disabled.

6. A method of controlling a traffic, the method comprising:
- receiving at least one packet from at least one external circuit;
- analyzing a protocol header for each of layers of the received packet;
- examining whether the layers satisfy a filtering condition, when the analyzing determines that the packet is error-free;
- identifying and classifying applications corresponding to the layers by using a high-speed search function when the layers do not satisfy the filtering condition; and
- executing a command to process the at least one packet based on a result of the identifying and classifying of the applications, wherein the executing of the command comprises:
- comparing a result of identifying and classifying traffic of the applications, and analyzing an original execution code value and a copy execution code value;
- comparing the original execution code value as a result of the comparing of the result of identifying and classifying the traffic of the applications;
- processing the packet based on the original execution code value;
- comparing the copy execution code value and determining whether a copied packet exists; and
- processing the packet based on the copy execution code in response to a packet collapse command of the copy execution code value, when the copied packet is determined to exist.

7. The method of claim 6, wherein the layers comprise at least one of a data link layer (L2), a network layer (L3), a transport layer (L4), and an application layer (L7).

8. The method of claim 7, wherein the analyzing of the protocol header comprises:
- extracting at least one of a value of a virtual Local Area Network (VLAN) identifier (ID), a source MAC address value, and a destination MAC address value, through an analysis of a header in the L2;
- extracting at least one of an IP protocol version value, a source IP address value, a destination IP address value, and a protocol number, through an analysis of a header in the L3; and
- extracting at least one of a number of a Transmission Control Protocol (TCP) packet, a number of a User Datagram Protocol (UDP) packet, a source port number, and a destination port number, through an analysis of a header in the L4.

9. The method of claim 8, wherein the analyzing of the protocol header further comprises determining whether the packet contains an error.

10. The method of claim 9, wherein the determining of whether the packet contains the error comprises:
- determining whether to correspond to a protocol format for each of the layers;
- determining whether a size indicated in the packet is identical to a size of an actually inputted packet; and
- determining whether the error occurs in at least one of a checksum field of an IP packet, a checksum field of the TCP packet, and a checksum field of the UDP packet.

11. The method of claim 7, wherein the examining of whether the layers satisfy the filtering condition comprises:
- examining whether a filtering function is performed for each of the layers;
- filtering the layers in a TCAM table based on the result of the analyzing of the protocol header, when the filtering function is performed for each of the layers;
- comparing a result of a filtering search of at least one layer of the L2, the L3, and the L4;
- examining whether the filtering function of the L7 is performed; and
- comparing a result of an L7 signature search.

12. The method of claim 11, wherein the comparing of the result of the filtering search comprises storing the result of the filtering search as a success when the filtering search succeeds.

13. The method of claim 11, wherein the examining of whether the filtering function of the L7 is performed comprises storing the result of the filtering search as a failure when the filtering function of the L7 is disabled.

14. The method of claim 11, wherein the comparing of the result of the L7 signature search comprises:
- storing the result of the filtering search as a success when the L7 signature search succeeds; and
- storing the result of the filtering search as a failure when the L7 signature search fails.

15. The method of claim 8, wherein the identifying and classifying of the applications comprises:
- searching for a classification TCAM table of the applications using an input interface number, the source IP address value, the destination IP address value, a protocol, the source port number, and the destination port number;
- storing a result of the identifying and classifying of the applications as a success, and extracting a packet process command code from the table, when the searching of the classification TCAM table succeeds;

searching for an application identification signature from an L7 payload of the packet, when the searching of the classification TCAM table fails;

storing the result of the identifying and classifying of the applications as a success, when the searching of the application identification signature succeeds; and storing the result of the identifying and classifying of the applications as a failure, when the searching of the application identification signature fails.

16. The method of claim 5, wherein the executing of the command comprises:

comparing a result of identifying and classifying traffic of the applications, and analyzing an original execution code value and a copy execution code value;

comparing the original execution code value as a result of the comparing of the result of identifying and classifying the traffic of the applications;

processing the packet based on the original execution code value;

comparing the copy execution code value and determining whether a copied packet exists; and processing the packet based on the copy execution code in response to a packet collapse command of the copy execution code value, when the copied packet is determined to exist.

17. The method of claim 16, wherein the original execution code value comprises a preceding execution code used to process an original packet from the packet execution code, and wherein the copy execution code value comprises a preceding execution code used to process the copied packet.

18. The method of claim 16, wherein the comparing of the original execution code value comprises generating a new packet from the original packet, and copying the new packet, when the original execution code value is set.

19. The method of claim 16, wherein the processing of the packet comprises:

generating a packet and returning the packet, when the original execution code value indicates a packet detour, the packet being used to connect to a HyperText Transfer Protocol (HTTP) detour site;

converting the packet into a Packet Capture (PCAP) format, reducing a size of the packet by a fixed length, and transmitting the packet to a Central Processing Unit (CPU) interface, when the original execution code value indicates a packet storage;

modifying a destination MAC address, a protocol, an IP address, a port number, a Type of Service (ToS), and a TCP flag to predetermined values, when the original execution code value indicates a packet modification; and processing the original packet based on an original packet execution code, when the original execution code value indicates a null value.

20. The method of claim 16, wherein the processing of the packet comprises transferring the packet, or copying the packet and transmitting the copied packet to a copied port, based on the copy execution code value, when the copied packet is determined to exist.

* * * * *